United States Patent
Yonnet

[11] Patent Number: 5,931,177
[45] Date of Patent: Aug. 3, 1999

[54] VALVES

[75] Inventor: Claude Yonnet, Matlock, United Kingdom

[73] Assignee: Technolog Limited, Matlock, United Kingdom

[21] Appl. No.: 08/817,979

[22] PCT Filed: Oct. 27, 1995

[86] PCT No.: PCT/GB95/02536

§ 371 Date: Apr. 28, 1997

§ 102(e) Date: Apr. 28, 1997

[87] PCT Pub. No.: WO96/13639

PCT Pub. Date: May 9, 1996

[30] Foreign Application Priority Data

Oct. 28, 1994 [GB] United Kingdom .................... 9421790

[51] Int. Cl.$^6$ .................................................. F16K 37/00
[52] U.S. Cl. .............................. 137/1; 137/368; 137/554; 137/556
[58] Field of Search ...................... 137/554, 365, 137/364, 556, 368, 1; 251/292

[56] References Cited

U.S. PATENT DOCUMENTS

| | | | |
|---|---|---|---|
| 2,847,642 | 8/1958 | Smith . | |
| 3,733,570 | 5/1973 | Worrall | 137/556 |
| 4,653,531 | 3/1987 | Gain, Jr. | 137/556 |
| 4,702,275 | 10/1987 | Ballun et al. | 137/556 |
| 5,099,867 | 3/1992 | Emery | 137/554 |
| 5,220,942 | 6/1993 | Garvin, Jr. et al. | 137/556 |

FOREIGN PATENT DOCUMENTS

| | | |
|---|---|---|
| 0 639 918 | 5/1990 | European Pat. Off. . |
| 0 620 327 | 10/1994 | European Pat. Off. . |

*Primary Examiner*—A. Michael Chambers
*Attorney, Agent, or Firm*—Head, Johnson & Kachigian

[57] ABSTRACT

This application discloses apparatus for logging the operation of a valve (10) of the type having a spindle (16) rotatable by a key (20) to effect opening and closing thereof, the apparatus including operative means (36) which are in use carried on a key (20), the operative means being operable independently of any other apparatus or electronic equipment to detect rotary motion of the key during operation of the valve. Preferably, the operative means includes sensor means (40, 42) sensitive to the earth's magnetic field, and is operative to determine rotation of the key by analysis of signals generated by the sensor means. By detecting valve operation with operative means on a key, the expense of providing detection apparatus for each valve is avoided (the total number of keys being much less than the total number of valves), as is the need to provide potentially delicate equipment in the hostile environs of the valves.

14 Claims, 2 Drawing Sheets

VALVES

CROSS-REFERENCE TO RELATED APPLICATIONS

This application is a 371 of PCT Application No. GB95/02536 which claims priority from British Patent Application No. 9421790.9 filed Oct. 28, 1994.

The present invention relates to valves. More particularly, it relates to valves having means to allow automatic logging of their opening and closing and to apparatus for opening and closing (generally referred to as "operating") such valves.

In a water distribution system, a large number of valves are provided to allow parts of the distribution system to be isolated for repair, to cut off water to a leak, and for many other purposes that arise during the day-to-day operation of the system. It is clearly desirable that those managing the system can determine the state of the valves at any time in order that they can predict the system's behaviour to ensure that all parts of the system operate safely and efficiently.

Traditionally, the state of valves is monitored, for example, by means of paper records, with an operator making a note each time a valve is operated. The information thus gathered can be collated to provide an instantaneous picture of the system as a whole. However, it is clear that operators will occasionally forget to log an operation or wrongly identify a valve, resulting in inaccuracies in the record of the system.

If it is desired to provide automatic logging of valve operation several difficulties must be overcome.

Firstly, the number of valves in a water distribution system is very large, which imposes the requirement that any apparatus to be fitted to the valves must be of as low cost as possible.

Secondly, the valves are often to be found below ground in damp, dirty and cramped conditions, meaning that any apparatus to be fitted to them must be small, robust and simple to fit.

Thirdly, it often happens that valve operating spindles become seized if not opened or closed for some time. Since the valves are normally controlled by means of a long key by a person some distance above, this often results in forces being applied to the valve which are not purely rotational, and in the key being displaced away from the axis of rotation of the valve spindle as the operator struggles to turn the spindle.

It is an aim of the invention to provide for automatic logging of the opening and closing of valves while minimising the effect of some or all of the above difficulties.

In a first of its aspects, the invention provides apparatus for logging the operation of a valve of the type having a spindle rotatable by a key to effect opening and closing thereof, the apparatus including operative means which are in use carried on a key, the operative means being operable independently of any other apparatus (e.g. electronic equipment) to detect rotary motion of the key during operation of the valve.

By detecting valve operation with operative means on a key, the expense of providing detection apparatus for each valve is avoided (the total number of keys being much less than the total number of valves), as is the need to provide potentially delicate equipment in the hostile environs of the valves. As the operable means is operable independently of any other apparatus i.e. does not require any other apparatus or equipment (or connection to any such apparatus or equipment) to perform the detection function, no additional modification to the valves is required.

The apparatus may be located on the key, and indeed may be manufactured as part of the key. Alternatively the apparatus may be adapted for connection to or fitting on an existing key. The phrase "carried on the key" or "located on the key" includes, for example, an embodiment where the apparatus is mounted on the surface of a part of the key, an embodiment where the apparatus is inside a part of the key and/or an embodiment where the apparatus is otherwise incorporated or included in any part of the key.

Preferably the operative means includes means for sensing rotation of the key. In this way, relative movement between the key and a valve can be detected, whilst still avoiding the need to provide further electronic equipment on each valve.

The operative means of the apparatus is, in most embodiments, predominantly electronic. In a preferred embodiment, the operative means includes sensor means sensitive to an ambient (preferably steady-state and stationary) magnetic field and is operative to determine rotation of the key by analysis of signals generated by the sensor means. Preferably, the ambient magnetic field includes as a major (or sole) component thereof the earth's magnetic field. However in certain locations, the effect of the earth's magnetic field may be only one, possibly minor, component of the ambient field e.g. inside buildings where other magnetic effect(s) or field(s) are present.

The sensor means may, for example, comprise a pair of directional magnetic sensors, most typically disposed at right angles to each other. By monitoring variations in the field detected by each sensor, rotation of the key can be determined. By analysis of the relative phase of the variations, the direction of rotation can be established, while the rate of variation can be used to determine the speed of rotation of the key.

Preferably, the sensor means comprises two pairs of directional magnetic sensors arranged e.g. in quadrature. Effectively each of the two sensors in the above-described embodiment is replaced by a pair of sensors. The two sensors of each pair are arranged in parallel, but oriented in diametrically opposite directions. This arrangement helps to reduce or eliminate variations in the aggregate signal produced by each sensor of a pair. In other words, whilst the variation in the output of the sensor due to rotation of the key remains unaffected, any steady-state component of the output can be removed.

Preferably, the apparatus includes detection means to detect connection of the key to a valve for operation thereof.

Preferably, the apparatus includes recording means for recording connection of the key to a valve and/or rotary motion of the key during operation of the valve.

Preferably, the valve is of the "on-off" type, i.e. is a stop valve and not a control valve.

Preferably each valve is provided with identification means operative to identify the valve to the operative means of the apparatus whereby the identity of the valve being operated may be automatically logged e.g. by the recording means. The identification means may comprise an electronic transponder fixed to part of the valve, the transponder preferably receiving power from the operative means of the key e.g. by inductive coupling. Thus there is no need to provide an independent power supply on each valve.

There may additionally be provided on each valve an electronic memory to and from which data may be written and read by the operative means of the key. The memory may be used to store information regarding the state of the valve following operation thereof by the key.

The transponder and/or the memory may be incorporated into a sealed, robust "pill" for incorporation into the valve. In this way, the electronic components associated with the valve may be robustly and compactly packaged. The pill may include a coil which picks up an electrical or magnetic field from the key by inductive coupling, thus allowing the operative means to "read" and/or "write" data to/from the pill.

Many valves have a valve top shaped and dimensioned to facilitate engagement by the key for rotation, the valve top being attached to a spindle or other component of the valve. In such valves, any identification means or memory may be incorporated into the valve top, particularly suitably where these are incorporated into a pill, as described in the last-preceding paragraph. A valve top as described is preferably of substantially the same dimensions as a conventional valve top, and may be provided as a retro-fit component to convert existing valves for use with the present invention.

From a second of its aspects, the invention provides a key including apparatus according to the first aspect of the invention.

In a third aspect, the present invention provides a method of logging the operation of a valve including the steps of sensing connection of a key to the valve and/or sensing and/or recording rotation of the key.

Preferably, the method includes the steps of using sensor means to sense variation in the ambient magnetic field as the key is rotated. By detection of such variations rotation of the key can be determined. Preferably the sensor means includes a plurality of sensors, and by analysis of the relative phase of the variations in the ambient e.g. earth's magnetic field detected by each sensor, the direction of rotation of the key can be determined. Furthermore, by analysis of the rate of variation of the field of one or more of the sensors, the speed of rotation of the key may be determined.

In a fourth aspect, the present invention provides apparatus for logging the operation of a valve of the type having a spindle rotatable by a key to effect opening and closing thereof, the apparatus including operative means which are in use carried on a key, the operative means being operable to detect connection of the key to a valve for operation thereof and/or to detect and/or to detect and/or record rotary motion of the key during operation of the valve.

An embodiment of the invention will now be described in detail, by way of example, with reference to the accompanying drawings in which.

Figure 1:
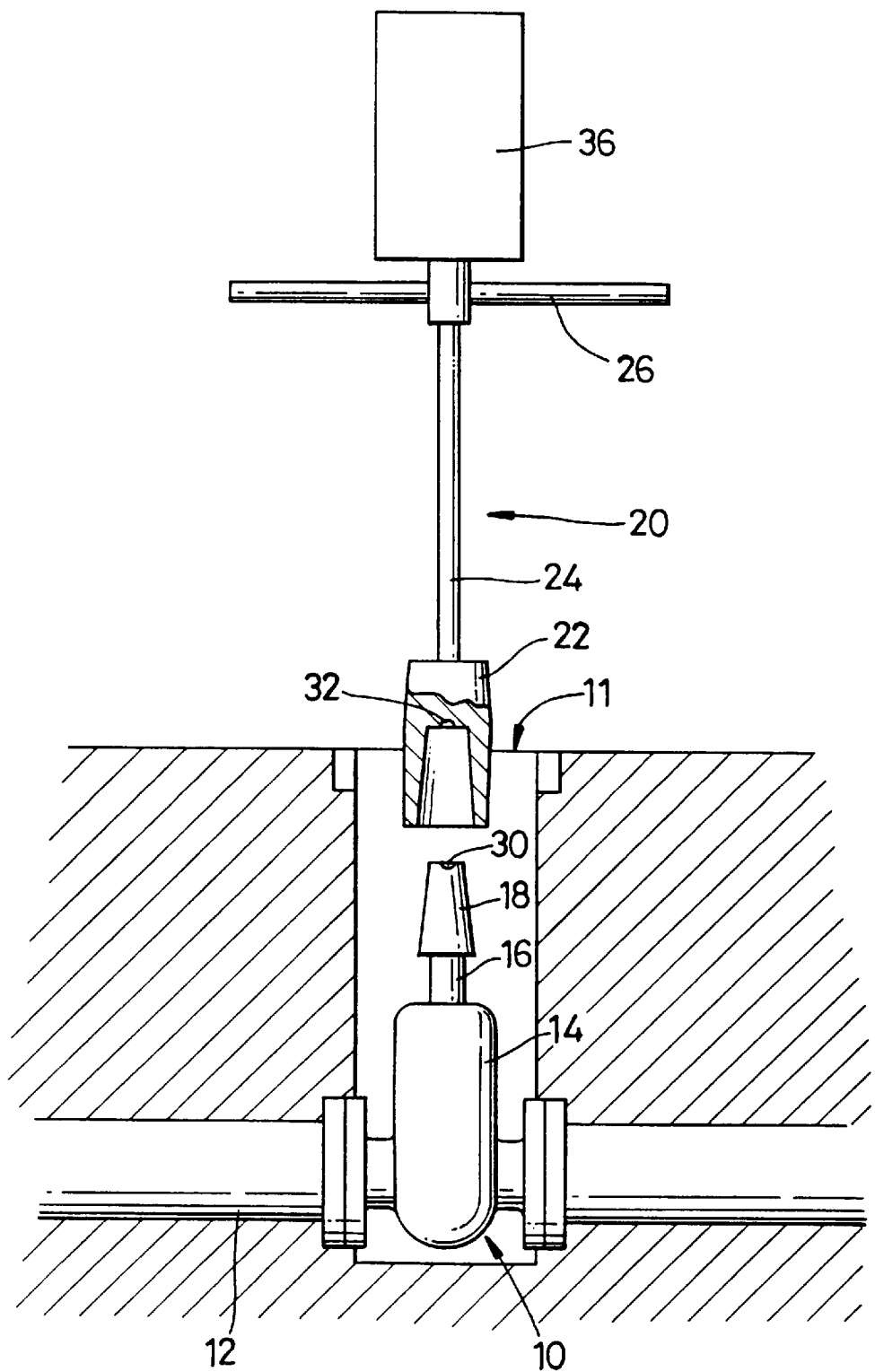
FIG. 1 is a part sectional diagram of a key and a valve together embodying the invention.

With reference first to FIG. 1, a valve 10 is provided in a water supply pipe 12 operable to selectively allow or prevent flow of water therein. As shown, the valve 10 is typically disposed below ground in a chamber 11 of limited size, the chamber 11 opening at ground level at an access cover (not shown). Any routine operation to be performed on the valve 10 is necessarily constrained by the size of the chamber 11.

The valve 10 comprises a body 14, a spindle 16 extending from the body 14 and a valve top 18. The spindle 16 is operatively connected to components within the valve body 14 such that rotation of it in a first direction (typically anti-clockwise) causes the valve 10 to open to allow flow, while rotation on the opposite direction causes the valve 10 to close to prevent flow.

In use, the valve 10 is typically disposed such that the spindle 16 projects generally vertically upwardly from the valve body 14. The valve top 18, in this disposition, projects upwardly from the spindle 16. The valve top 18 is shaped and dimensioned for cooperation with a key 20 to operatively couple the key 20 to the spindle 16 such that the spindle 16 can be rotated by means of the key 20.

The key 20 comprises a head 22, which is adapted for engagement with the valve top 18 and a shaft 24 connected to the head 22, the shaft 24 being generally coaxial with the axis of rotation of the spindle 16 when the head 22 is engaged for use with the valve top 18. The key also comprises a transverse bar 26 connected to the shaft 24 to act as a lever by means of which the shaft 24 may be driven to operate the valve 10.

In this embodiment of the present invention, there is provided in the valve top 18 a sealed electronic package 30 (which may be referred to as a "pill") comprising an encoded electronic device by means of which the valve 10 can be uniquely identified, and power receiving means by which electrical power may be generated from an external energy source. For example, the package 30 may comprise a coil activated by an external magnetic field to generate electrical power for operation of the package 30.

Within the head 22 of the key 20 there is provided an electronic coupler 32 through which electrical power can be transmitted to and data received from the package 30 of a valve 10 to which the key 20 is connected for operation. The coupler 32 may also comprise a coil. As is well known, power and data signals may be transmitted between two magnetically coupled coils by application of an alternating signal to a first coil, to cause a voltage signal to be induced in the second, transmission of data being accomplished by modulation of the electrical load applied to the second coil, this being reflected as a modulation of the impedance of the first.

The key 20 further comprises an operative unit 36. The operative unit 36 comprises electronic circuits connected to the coupler 32 to transmit power to and receive data from the package 30 of a valve 10. Additionally, the operative unit further comprises sensor means to detect rotary movement of the key 20 as might occur during operation of a valve.

Figure 2:
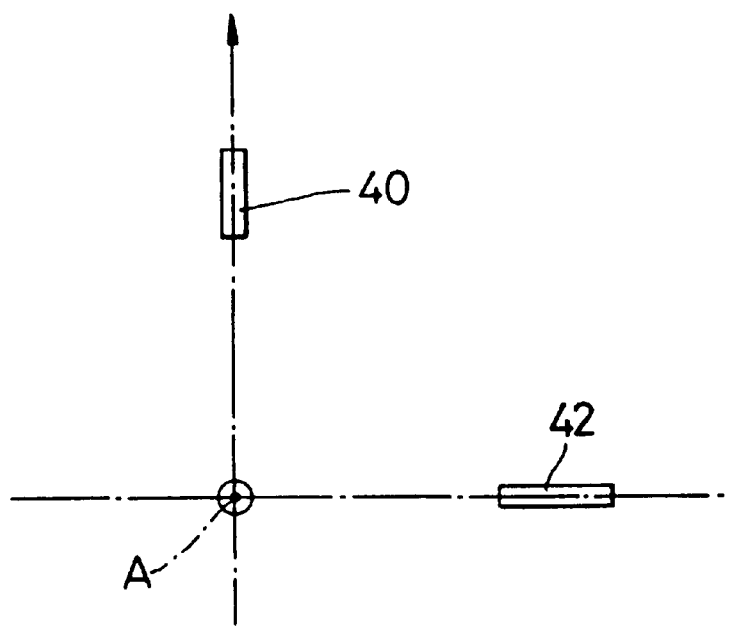
FIG. 2 is a schematic diagram of an arrangement of magnetic sensors within the key.

Shown schematically in FIG. 2, the sensor means comprises first and second directional magnetic sensors 40, 42. The sensors 40, 42 are disposed in quadrature i.e. with detection axes at right angles to one another and spaced angularly about an axis, the second sensor 42 (when viewed from above) being 90° clockwise of the first sensor 40. As shown in FIG. 2, the axis "A" is an extension of the axis of the shaft 24, and normal to the plane of the drawing of FIG. 2. As the key 20 is rotated, the output from each sensor 40, 42 varies sinusoidally with the rotational angle θ of the key 20, as the sensors rotate within the directional ambient magnetic field.

Figure 3:
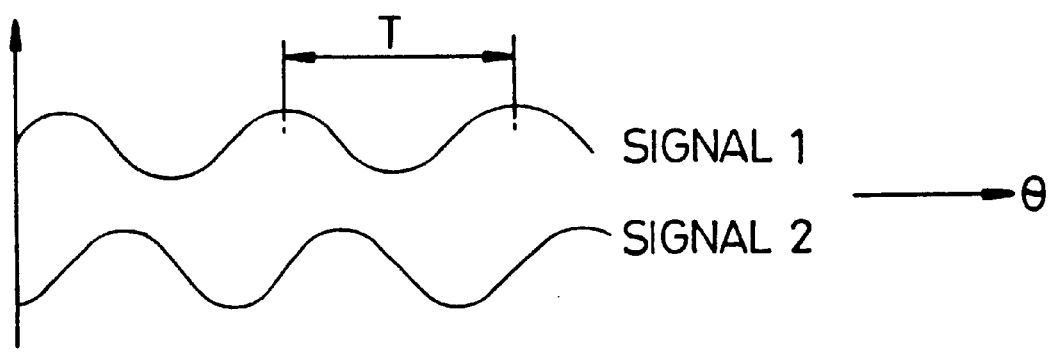
FIG. 3 shows a representation of signals generated by the sensors during rotation of the key.

With reference to FIG. 3, there is shown the output from the first and second sensors 40, 42 as signals 1 and 2 respectively, with respect to angle θ. As illustrated in FIG. 3, the phase of signal 1 is leading that of signal 2 by 90°, from which it can be deduced that the key is rotating anti-clockwise. If the phase of signal 2 were leading, then clockwise rotation would be implied. In FIG. 3, the period T represents one complete rotation. Analysis of the two signals can further reveal the value of the angle θ by quadrature analysis.

In an alternative embodiment, each of the first and second sensors 40,42 may be replaced by a respective pair of sensors. The two sensors of a pair are located in parallel but in diametrically opposite sensing directions. In this way, the alternating signal produced by each sensor is added to that produced by the other sensor of the pair, whilst the steady state signals produced by each sensor cancel out. Thus, the aggregate signal produced by the pair of sensors may be maintained whilst the "DC" component can be removed.

In use, the operative unit 36 of the key 20 is powered, for example by a rechargeable battery, and is normally in a standing mode in which signals received from the coupler 32 are monitored.

If the signals from the coupler 32 correspond to those that might emanate from a package 30 of a valve top, the operative unit 36 enters an operational mode. In this mode, the operative unit first reads from the package 30 a code to identify the valve and then reads the data stored in the package during the last valve operation by which the current state of the valve may be determined. The inputs from the sensors 40, 42 are then monitored for rotation, and the current valve state is periodically updated in the package 30.

Once the operative unit 36 detects that the key 20 has been removed from the valve, it stores in an internal memory (not shown) identifying the valve, its new state and the operation that was carried out on the valve, including the speed at which the valve was turned. This data can later be downloaded to a computer to update data held therein relating to the water distribution systems as a whole.

The above description is an illustrative example of one embodiment only, and the invention is not restricted to the details of the foregoing embodiment. A reader skilled in the art will appreciate that features of the embodiment may be replaced by alternative features serving equivalent or similar purposes. For example, the operative means may not include the memory described above, but instead may be connected in some other way e.g. by direct or radio link, to an external computer or data logging device. Additionally, or alternatively, the coupler 32 and associated circuitry may be omitted.

I claim:

1. A method of detecting operation of a valve including the step of using magnetic sensor means which are in use carried on a key and are sensitive to an ambient magnetic field external to the key, and determining changes in the magnetic field detected by the sensor means as the sensor means are rotated in conjunction with a valve key thereby determining rotation of the key.

2. Apparatus for logging the operation of a valve of the type having a spindle rotatable by a key to effect opening and closing of the valve, comprising:
   (a) operative means carried on the key to detect rotary motion of the key during operation of the valve;
   (b) a sensor sensitive to an ambient magnetic field external to the key said sensor generating signals for analysis by said operative means to determine rotation of the key; and
   (c) means for monitoring variations in the ambient magnetic field external to the key detected by the sensor, and thereby determining rotation of the key.

3. Apparatus according to claim 2 wherein the sensor means includes a pair of directional magnetic sensors which, in use, produce a signal as they are moved through the earth's magnetic field by rotation of the key.

4. Apparatus according to claim 3 wherein each one of the pair of directional magnetic sensors produces a respective signal, the signals having a different phase to each other, the apparatus including means for analysis of the relative phase of the variations and thereby determining the direction of rotation of the key.

5. Apparatus according to claim 3 wherein the pair of sensors are disposed at right angles to each other.

6. Apparatus according to claim 5 wherein each sensor comprises a pair of diametrically opposed sensors.

7. Apparatus according to claim 3 wherein said means for analysis of the relative phase are operable to determine the rate of variation of the field of each sensor, and thereby to determine the speed of rotation of the key.

8. Apparatus according to claim 2 including detection means to detect connection of the key to a valve for operation thereof.

9. Apparatus according to claim 2 including recording means for recording connection of the key to a valve during operation.

10. Apparatus according to claim 2 including recording means for recording connection of the key to a rotary motion of the key during operation.

11. Apparatus according to claim 3 wherein each sensor comprises a pair of diametrically opposed sensors.

12. The apparatus of claim 2, further comprising identification means for identifying the valve to the operative means.

13. The apparatus of claim 12, wherein said identification means is an electronic transponder powered by an inductive coupling with said operative means.

14. The apparatus of claim 12 wherein said ambient magnetic field external to said key is determined without reference to any apparatus permanently located on said valve.

* * * * *